US012652117B2

(12) United States Patent
Yokota

(10) Patent No.: US 12,652,117 B2
(45) Date of Patent: Jun. 9, 2026

(54) DIFFRACTION LOSS ANALYSIS DEVICE, DIFFRACTION LOSS ANALYSIS METHOD, AND RECORDING MEDIUM

(71) Applicant: NEC Corporation, Tokyo (JP)

(72) Inventor: Nobuyuki Yokota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 18/687,427

(22) PCT Filed: Sep. 7, 2022

(86) PCT No.: PCT/JP2022/033547
§ 371 (c)(1),
(2) Date: Feb. 28, 2024

(87) PCT Pub. No.: WO2023/042724
PCT Pub. Date: Mar. 23, 2023

(65) Prior Publication Data
US 2024/0372637 A1 Nov. 7, 2024

(30) Foreign Application Priority Data

Sep. 16, 2021 (JP) ................................. 2021-151197

(51) Int. Cl.
*H04B 17/00* (2015.01)
*H04B 17/309* (2015.01)
(Continued)

(52) U.S. Cl.
CPC ......... *H04B 17/347* (2023.05); *H04B 17/391* (2015.01)

(58) Field of Classification Search
None
See application file for complete search history.

(56) References Cited

U.S. PATENT DOCUMENTS 8,131,312 B2 * 3/2012 Levin ................... H04B 17/391
370/254
8,280,384 B2 * 10/2012 Carlson ................. H04W 4/029
455/446
(Continued)

FOREIGN PATENT DOCUMENTS

CN 101478776 A 7/2009
JP 2008-270875 A 11/2008
(Continued)

OTHER PUBLICATIONS

European Search Report for EP Application No. 22869871.8, dated on Oct. 9, 2024.
(Continued)

*Primary Examiner* — Tuan A Tran
(74) *Attorney, Agent, or Firm* — Sughrue Mion, PLLC

(57) ABSTRACT

The diffraction loss analysis device calculates, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna. The diffraction loss analysis device generates a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

9 Claims, 5 Drawing Sheets

(51) Int. Cl.
　　H04B 17/373 　　(2015.01)
　　H04B 17/391 　　(2015.01)

(56) References Cited

U.S. PATENT DOCUMENTS

| 8,521,092 | B2 * | 8/2013 | Kennedy | H04B 17/10 |
| | | | | 375/228 |
| 8,654,672 | B1 * | 2/2014 | Nicholas | H04W 40/246 |
| | | | | 703/22 |
| 9,020,440 | B2 * | 4/2015 | Kyosti | H04B 17/0087 |
| | | | | 455/67.11 |
| 9,198,044 | B2 * | 11/2015 | Solondz | H04L 9/3234 |
| 9,237,574 | B2 * | 1/2016 | Nakamura | H04W 72/0453 |
| 9,319,157 | B2 * | 4/2016 | Alexander | H04B 17/309 |
| 9,426,044 | B2 * | 8/2016 | Gloss | H04W 24/10 |
| 9,654,986 | B2 * | 5/2017 | Kennedy | H04B 17/10 |
| 9,698,843 | B2 * | 7/2017 | Alexander | H04B 17/364 |
| 9,699,663 | B1 * | 7/2017 | Jovancevic | G01S 7/021 |
| 10,397,798 | B2 * | 8/2019 | Wills | H04W 16/02 |
| 10,397,799 | B2 * | 8/2019 | Wills | H04W 16/18 |
| 11,016,173 | B2 * | 5/2021 | Hoffman | G01S 7/4021 |
| 11,051,177 | B2 * | 6/2021 | Srinivasan | H04B 17/391 |
| 11,128,391 | B1 * | 9/2021 | Aldossari | H04B 17/3911 |
| 11,133,880 | B2 * | 9/2021 | Yamada | H04B 17/391 |
| 11,228,922 | B2 * | 1/2022 | Beck | H04B 17/3911 |
| 11,234,135 | B2 * | 1/2022 | Macmullan | H04W 24/02 |
| 11,252,574 | B2 * | 2/2022 | Macmullan | H04W 72/0453 |
| 11,343,817 | B2 * | 5/2022 | Amouris | H04W 40/22 |
| 11,470,482 | B2 * | 10/2022 | Srinivasan | H04B 17/391 |
| 11,659,405 | B2 * | 5/2023 | Macmullan | H04W 72/0453 |
| | | | | 370/329 |
| 11,800,378 | B2 * | 10/2023 | Beck | H04B 17/3911 |
| 2006/0003774 | A1 | 1/2006 | Byun et al. | |

FOREIGN PATENT DOCUMENTS

| JP | 2013-058929 A | 3/2013 |
| WO | 2015/089636 A1 | 6/2015 |

OTHER PUBLICATIONS

S.M. Mehdi Dehghan et al., "Aerial obstacle estimation using RSSI observations based on OHLOSS diffraction model", 2014 Second RSI/ISM International Conference on Robotics and Mechatronics (ICROM), IEEE, Oct. 15, 2014, pp. 564-569.

S.M. Mehdi Dehghan et al., "A geometrical approach for aerial cooperative obstacle mapping using RSSI observations"; 2014 Second RSI/ISM International Conference on Robotics and Mechatronics (ICROM), IEEE, Oct. 15, 2014, pp. 197-202.

Xiaoye Wang et al., "Evaluation of multipath signal loss for AIS signals transmitted on the sea surface", Ocean Engineering, Pergamon, Amsterdam, NL, vol. 146, Sep. 27, 2017, pp. 9-20.

International Search Report for PCT Application No. PCT/JP2022/033547, mailed on Dec. 6, 2022.

* cited by examiner

FIG. 6

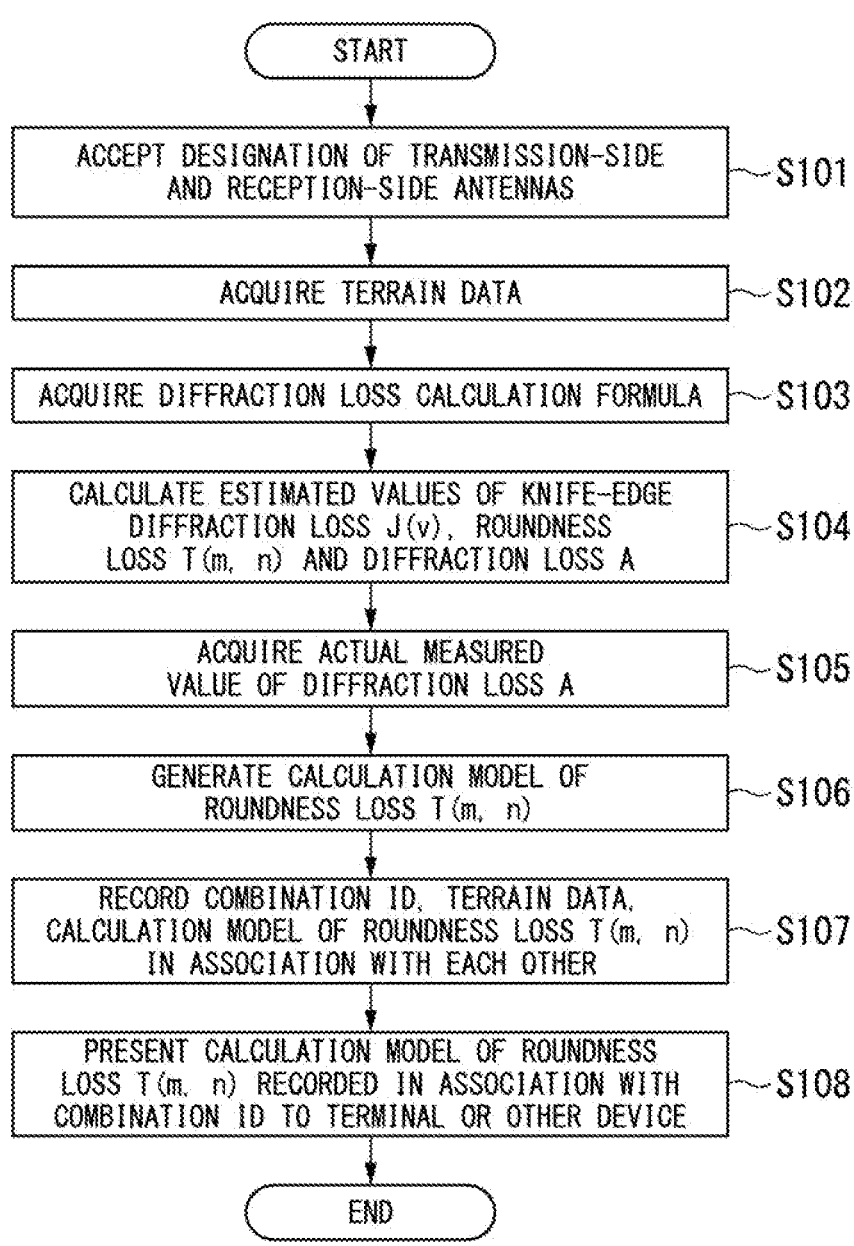

START

ACCEPT DESIGNATION OF TRANSMISSION-SIDE
AND RECEPTION-SIDE ANTENNAS — S101

ACQUIRE TERRAIN DATA — S102

ACQUIRE DIFFRACTION LOSS CALCULATION FORMULA — S103

CALCULATE ESTIMATED VALUES OF KNIFE-EDGE
DIFFRACTION LOSS J(v), ROUNDNESS
LOSS T(m, n) AND DIFFRACTION LOSS A — S104

ACQUIRE ACTUAL MEASURED
VALUE OF DIFFRACTION LOSS A — S105

GENERATE CALCULATION MODEL OF
ROUNDNESS LOSS T(m, n) — S106

RECORD COMBINATION ID, TERRAIN DATA,
CALCULATION MODEL OF ROUNDNESS LOSS T(m, n)
IN ASSOCIATION WITH EACH OTHER — S107

PRESENT CALCULATION MODEL OF ROUNDNESS
LOSS T(m, n) RECORDED IN ASSOCIATION WITH
COMBINATION ID TO TERMINAL OR OTHER DEVICE — S108

END

DIFFRACTION LOSS ANALYSIS DEVICE, DIFFRACTION LOSS ANALYSIS METHOD, AND RECORDING MEDIUM

This application is a National Stage Entry of PCT/JP2022/033547 filed on Sep. 7, 2022, which claims priority from JP Patent Application 2021-151197 filed on Sep. 16, 2021, the contents of all of which are incorporated herein by reference, in their entirety.

TECHNICAL FIELD

The present disclosure relates to a diffraction loss analysis device, a diffraction loss analysis method, and a recording medium for analyzing diffraction loss of radio waves.

BACKGROUND ART

There is a technology for out-of-sight radio communication between a transmitting point and a receiving point separated by mountainous terrain, and the like, where direct waves cannot reach. In such a technology, the orientation of the transmission-side antenna at the transmitting point and the reception-side antenna at the receiving point is aligned, with each antenna being directed towards the top of the mountainous area. The transmission-side and reception-side antennas used for such radio communications have large antenna diameters and use high-power power amplification devices. Over-the-horizon (OH) communication is sometimes used to refer to out-of-sight radio communications. It is necessary to calculate the diffraction loss of radio waves in line design work, where it is necessary to ascertain the propagation loss in the radio wave communication path between the installation location of the transmission-side antenna and the installation location of the reception-side antenna, where OH communication takes place.

Related technology is disclosed in Patent Document 1. Patent Document 1 discloses a technique for determining representative diffraction points for a building and calculating the amount of loss in the radio propagation path by means of a knife-edge diffraction model.

PRIOR ART DOCUMENTS

Patent Document

Patent Document 1: Japanese Unexamined Patent Application, First Publication No. 2013-058929

SUMMARY OF THE INVENTIONS

Problems to be Solved by the Invention

Diffraction loss, which is one of the propagation losses in the radio communication path between the installation locations of the transmission-side and reception-side antennas, where communication takes place, must be analyzed with high accuracy.

An example of an object of the present disclosure is to provide a diffraction loss analysis device, a diffraction loss analysis method, and a recording medium that solve the above-mentioned problems.

Means for Solving the Problem

According to the first example aspect of the present disclosure, the diffraction loss analysis device includes an estimated value calculation means that calculates, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna, and a model generation means that generates a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

According to the second example aspect of the present disclosure, the diffraction loss analysis method includes calculating, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna, and generating a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

According to a third example aspect of the present disclosure, the recording medium stores a program that causes a computer of a diffraction loss analysis device to execute calculating, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna, and generating a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

Effect of Invention

According to the present disclosure, it is possible to obtain a calculation formula for analyzing diffraction loss, which is one of the propagation losses in the radio communication path between the installation positions of a transmission-side antenna and a reception-side antenna, with high accuracy.

BRIEF DESCRIPTION OF THE DRAWINGS

FIG. 6 is a diagram showing the processing flow of the diffraction loss analysis device according to the present example embodiment.

Example Embodiment

The diffraction loss analysis device for a radio communication system according to one example embodiment of the present disclosure is described below with reference to the drawings.

Figure 1:
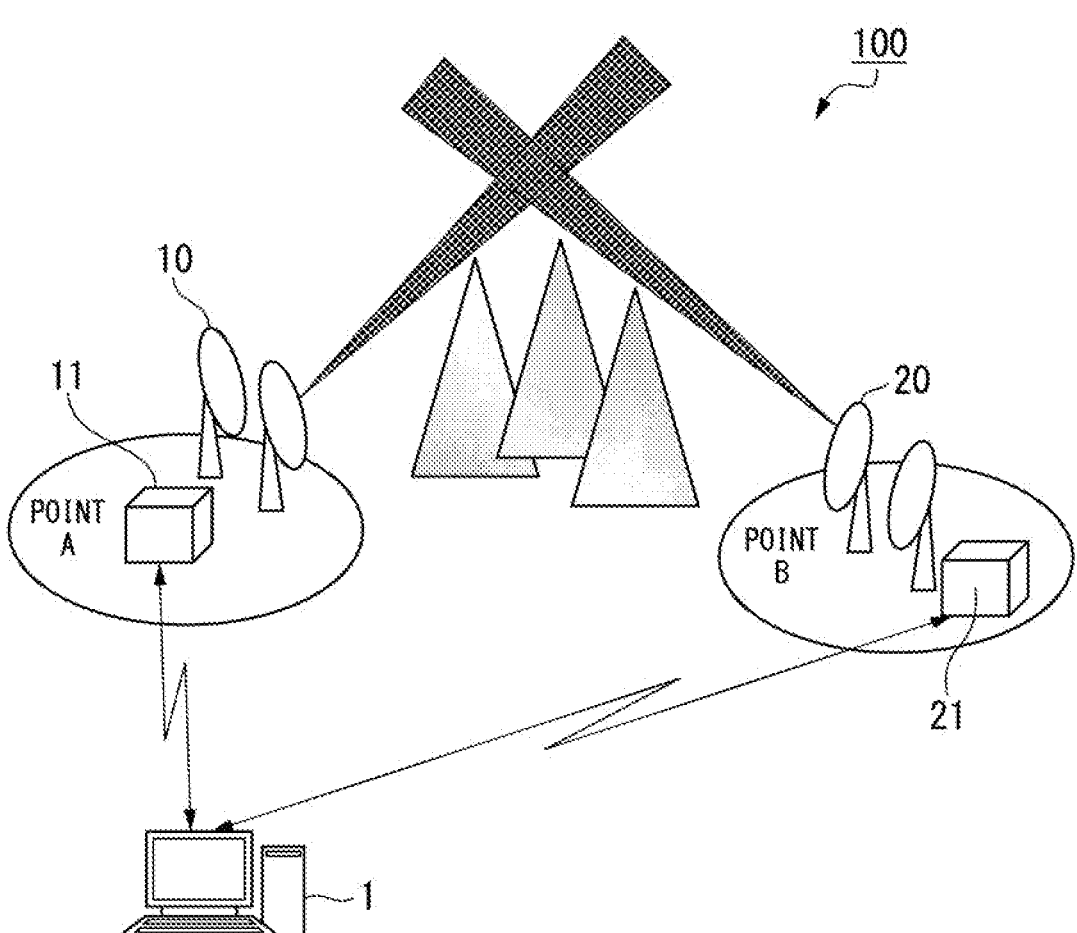
FIG. 1 is a diagram showing the configuration of a radio communication system with a radio communication path in which the diffraction loss analysis device according to the present example embodiment estimates diffraction loss.

FIG. 1 is a diagram showing the configuration of a radio communication system with a radio communication path in which the diffraction loss analysis device in the present example embodiment estimates diffraction loss. As shown in FIG. 1, a radio communication system 100 has radio communication facilities consisting of antennas and radio control equipment at points A and B, which are separated by a mountainous area, for example. The first radio facility at point A is equipped with an antenna 10 and a radio control device 11. The second radio facility at point B is equipped with an antenna 20 and a radio control device 21. The diffraction loss analysis device 1 may be communicatively connected to the radio control device 11 and the radio control device 21.

When one of the antennas 10 and 20 transmits radio waves, the other of the antennas 10 and 20 receives diffracted or reflected waves from obstacles such as mountainous areas. This allows OH communication, which is radio communication with no line-of-sight between the antenna 10 and the antenna 20. The radio control device 11 controls signal amplification and output power at the antenna 10, the direction of transmission and reception of transmitted radio waves, and so on. The radio control device 21 controls the amplification and output power of the signal at the antenna 20, the direction of transmission and reception of the transmitted radio waves, and so on. The diffraction loss analysis device 1 is a computer device provided to assist in line design according to any installation location of the antenna 10 and the antenna 20, and identifies the formula used for diffraction loss in the radio communication path between the transmission-side and reception-side antennas, such as the antenna 10 and antenna 20.

Specifically, the diffraction loss analysis device 1 calculates an estimated value of the diffraction loss of the radio communication path based on the topographical data of the radio communication path between the installation positions of the transmission-side antenna and the reception-side antenna. The diffraction loss analysis device 1 generates a roundness loss estimation model that estimates roundness loss in accordance with the cross-sectional roundness in the direction of the radio communication path of the terrain data shape in the diffraction loss calculation formula, on the basis of the relationship between the estimated value of the diffraction loss and the diffraction loss calculation formula, and the actual measured value of the diffraction loss. A cross-section in the direction of a radio communication path may be a cross-section (ground surface) tangent to (included in) a (virtual) plane that includes the radio communication path (see FIG. 5).

Figure 2:
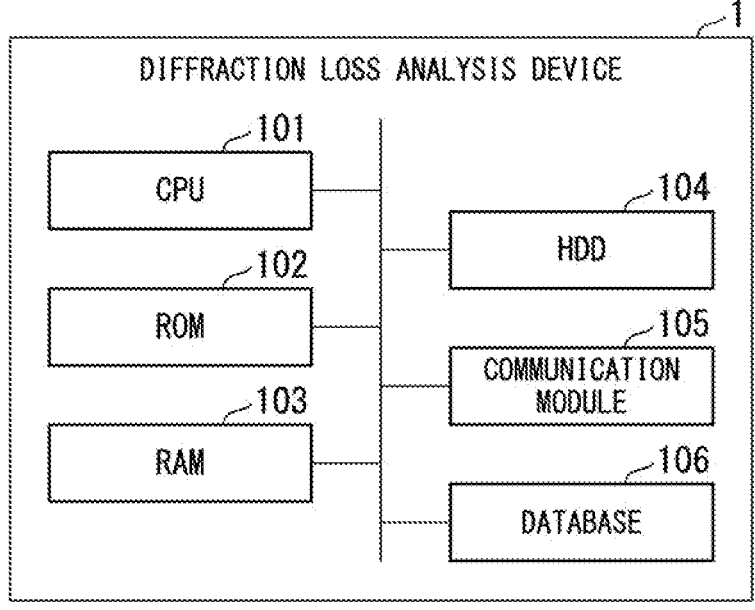
FIG. 2 is a hardware configuration diagram of the diffraction loss analysis device according to the present example embodiment.

FIG. 2 is a hardware configuration diagram of the diffraction loss analysis device according to the present example embodiment.

As FIG. 2 shows, the diffraction loss analysis device 1 is a computer equipped with hardware such as a CPU (Central Processing Unit) 101, ROM (Read Only Memory) 102, RAM (Random Access Memory) 103, HDD (Hard Disk Drive) 104, communication module 105, database 106, and other hardware. The radio control device 11 and the radio control device 21 may have similar hardware configurations.

Figure 3:
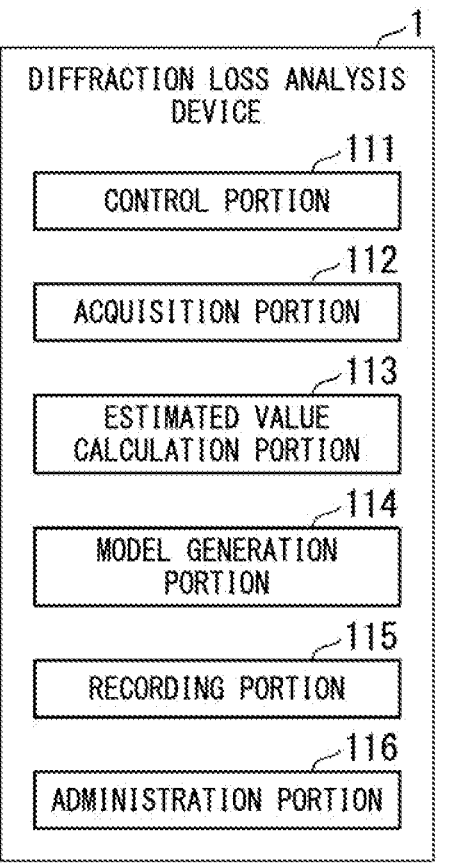
FIG. 3 is a functional block diagram of the diffraction loss analysis device according to the present example embodiment.

FIG. 3 is a functional block diagram of the diffraction loss analysis device according to the present example embodiment.

The diffraction loss analysis device 1 executes the processing program. This allows the diffraction loss analysis device 1 to perform the functions of a control portion 111, an acquisition portion 112, an estimated value calculation portion 113, a model generation portion 114, a recording portion 115, and an administration portion 116.

The control portion 111 controls each functional portion of the diffraction loss analysis device 1.

The acquisition portion 112 acquires various data for processing by the diffraction loss analysis device 1. For example, the acquisition portion 112 acquires the actual measured value of diffraction loss calculated in advance in the radio communication path between the installation positions of the transmission-side antenna and the reception-side antenna from the radio control device 11 or the radio control device 21. The acquisition portion 112 acquires from the database 106 the topographical data of the radio communication path between the installation location of the transmission-side antenna and the installation location of the reception-side antenna. The acquisition portion 112 acquires other data.

The estimated value calculation portion 113 calculates the estimated value of the diffraction loss of the radio communication path based on the topographical data of the radio communication path between the installation positions of the transmission-side antenna and the reception-side antenna.

The model generation portion 114 generates a roundness loss estimation model to estimate roundness loss in accordance with the cross-sectional roundness in the direction of the radio communication path of the terrain data shape in the diffraction loss calculation formula, on the basis of the relationship between the estimated value of the diffraction loss and the diffraction loss calculation formula, and the actual measured value of the diffraction loss.

The recording portion 115 records information indicating the radio communication path between the installation location of the transmission-side antenna and the installation location of the reception-side antenna, information on the terrain data corresponding to that radio communication path, and the roundness loss estimation model in association with each other.

The administration portion 116 presents a roundness loss estimation model to the user's terminal or other device on the basis of either terrain data or antenna information about a new transmission-side antenna installation location and reception-side antenna installation location.

Figure 4:
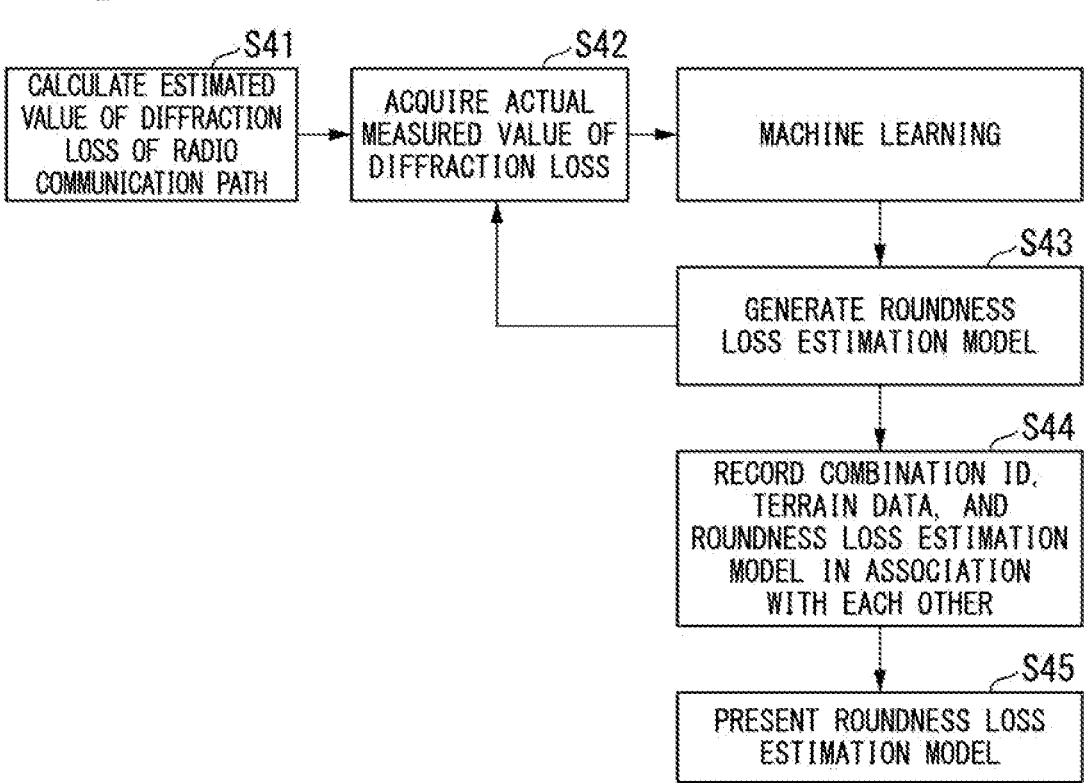
FIG. 4 is a diagram showing an overview of the processing of the diffraction loss analysis device according to the present example embodiment.

FIG. 4 is a diagram showing an overview of the processing of the diffraction loss analysis device.

The diffraction loss analysis device 1 acquires topographic data of the radio communication path between the installation positions of the transmission-side and reception-side antennas and a calculation formula for calculating the diffraction loss of the radio communication path, and calculates an estimated value of the diffraction loss of the radio communication path (Step S41). The diffraction loss analysis device 1 acquires the actual measured value of diffraction loss in the radio communication path between the installation positions of the transmission-side and reception-side antennas (Step S42). The diffraction loss analysis device 1 uses a machine learning technique to generate a roundness loss estimation model that estimates the roundness loss in accordance with the cross-sectional roundness in the direction of the radio communication path of the terrain data shape in the diffraction loss calculation formula, on the basis of the relationship between the estimated value of the diffraction loss and the diffraction loss calculation formula, and the actual measured value of the diffraction loss (Step S43). The diffraction loss analysis device 1 records the combination ID identifying the combination of the transmission-side and reception-side antennas, the terrain data of the radio communication path between the installation locations of the transmission-side and reception-side antennas, and the roundness loss estimation model in association with each other (Step S44). The diffraction loss analysis device 1 presents the roundness loss estimation model based on either the terrain data or antenna information (combination ID) about the installation locations of the new transmission-side and reception-side antennas (Step S45).

Figure 5:
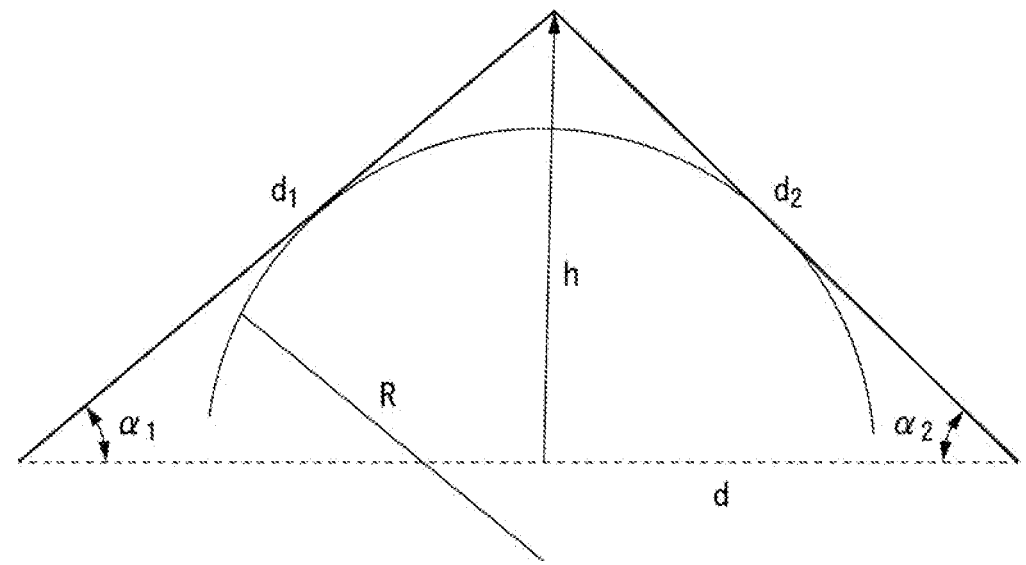
FIG. 5 is a diagram illustrating the parameters used in the roundness loss calculation formula according to the present example embodiment.

FIG. 5 is a diagram illustrating the parameters used in the roundness loss calculation formula.

The formula for calculating roundness loss is a formula for calculating the loss when radio waves traveling along radio communication paths d1 and d2 of OH communication tangential to the roundness of the cross section of the ground surface as shown in FIG. 5 diffract at the ground surface, and can be expressed as T(m, n). m and n can be expressed as formulas (1) and (2). In Formula (1), d1 and d2 are the radio communication paths of the radio waves from each of the opposing antennas, each expressed as a value indicating the distance. R is the radius of the circle that models the roundness of the ground surface, e.g., a mountain top, and h is the height of the ground surface representing the roundness. In FIGS. 5, a1 and a2 indicate the directional angles of the transmission-side and reception-side antennas, respectively. Note that in locations with larger curvature, such as mountain tops in mountainous areas, diffraction becomes less likely.

[Formula 1]

$$m = R\left[\frac{d_1 + d_2}{d_1 d_2}\right] / \left[\frac{\pi R}{\lambda}\right]^{1/3} \tag{1}$$

[Formula 2]

$$n = h\left[\frac{\pi R}{\lambda}\right]^{2/3} / R \tag{2}$$

The diffraction loss A of the radio communication path can be expressed as in Formula (3) using the knife-edge diffraction loss J(v) at the vertex where the radio waves d1 and d2 intersect and the aforementioned roundness diffraction loss T(m, n).

[Formula 3]

$$A = J(v) + T(m, n) \tag{3}$$

T(m, n) can also be calculated according to the ITU-R (International Telecommunication Union. Radio Communication Sector) regulations, such as Formulas (4) and (5) below:

[Formula 4]

$$T(m, n) = 7.2m^{1/2} - (2 - 12.5n)m + 3.6m^{3/2} - 0.8m^2 \text{ dB} \tag{4}$$

$$\text{for } mn \leq 4$$

[Formula 5]

$$T(m, n) = \tag{5}$$
$$-6 - 20\log(mn) + 7.2m^{1/2} - (2 - 17n)m + 3.6m^{3/2} - 0.8m^2 \text{ dB}$$

$$\text{for } mn > 4$$

FIG. 6 is a diagram showing an overview of the processing of the diffraction loss analysis device.

The following is a description of the processing flow of the diffraction loss analysis device 1 according to the example embodiment.

The acquisition portion 112 of the diffraction loss analysis device 1 accepts the designation of the transmission-side and reception-side antennas based on the operation of an administrator or other person (Step S101). The acquisition portion 112 acquires from the database 106 or the like terrain data of the ground surface corresponding to the radio communication path when the antenna 10 or antenna 20 is the transmission-side and reception-side antenna (Step S102). The terrain data may be information indicated by radio communication path d1, radio communication path d2, radius R, height h, etc., identified by modeling the acquired terrain data described above. The terrain data may be the coordinates (latitude, longitude, altitude) and distances of the transmission-side and reception-side antennas, the coordinates (latitude, longitude, altitude) of the summits of mountainous areas between the antennas, and the coordinates (latitude, longitude, altitude) of points at predetermined intervals in a straight line between the antennas.

The acquisition portion 112 also acquires a formula for calculating diffraction loss (Step S103). The acquisition portion 112 outputs those acquired information to the estimated value calculation portion 113. The estimated value calculation portion 113 calculates the estimated values of the knife-edge diffraction loss J(v), roundness loss T(m, n) and diffraction loss A using the above formula and other known formulas, using each parameter such as the radio communication path d1, radio communication path d2, radius R and height h identified by modeling the acquired terrain data as shown in FIG. 5 (Step S104). The estimated value calculation portion 113 outputs each estimated value of the diffraction loss A, the knife-edge diffraction loss J(v), and the roundness loss T(m, n) to the model generation portion 114.

The acquisition portion 112 acquires the actual measured value of the diffraction loss A calculated in the past in the radio communication path between the designated transmission-side and reception-side antennas (Step S105). This actual measured value of the diffraction loss A may be a value calculated at the radio control device 11 or radio control device 21, or may be a value calculated by the diffraction loss analysis device 1 using a known technique based on the reception power value or transmission power value acquired from the radio control device 11 or radio control device 21. The actual measured value A of the diffraction loss is recorded in the database 106 for each combination of transmission-side and reception-side antennas, and the acquisition portion 112 may acquire from the database 106 the actual measured value A of the diffraction loss recorded in association with the combination ID indicating the specified combination of transmission-side and reception-side antennas. The acquisition portion 112 outputs the actual measured value of the diffraction loss A to the model generation portion 114.

The model generation portion 114 acquires the relationship between the actual measured values of diffraction loss A, the estimated values of the diffraction loss A, knife-edge diffraction loss J(v), and roundness loss T(m, n), and the terrain data. By repeating the process described above, the model generation portion 114 acquires multiple relationships between the actual measured value of the diffraction loss A, each estimated value of the diffraction loss A, knife-edge diffraction loss J(v), and roundness loss T(m, n), and the terrain data, calculated on the basis of multiple timings and multiple pieces of terrain data. The model generation portion 114 machine-learns a plurality of pieces of data showing the relationship between those actual measured values of diffraction loss A, the estimated values of the diffraction loss A, knife-edge diffraction loss J(v), and roundness loss T(m, n), and the terrain data, to generate a calculation model of roundness loss T(m, n) such that the estimated value of the diffraction loss A, which is the sum of the estimated value of the roundness loss T(m, n) and the knife-edge diffraction loss J(v), approaches the actual measured value of the diffraction loss A (Step S106). Any known machine learning technique may be used to generate the calculation model for roundness loss T(m, n).

The model generation portion 114 outputs to the recording portion 115 the combination ID indicating the specified combination of the transmission-side and reception-side antennas, the terrain data corresponding to the radio communication path of the transmission-side and reception-side antennas, and the calculation model of the calculated roundness loss T(m, n). The recording portion 115 associates the combination ID indicating the specified combination of the transmission-side and reception-side antennas, the terrain data corresponding to the radio communication path of the transmission-side and reception-side antennas, and the calculation model of the calculated roundness loss T(m, n), and records them in the database 106 (Step S107).

The diffraction loss analysis device 1 may perform the same process for each combination of the transmission-side and reception-side antennas that differs by the process described above, and for each of those combinations, may record the combination ID, the terrain data, and the calculation model of roundness loss T(m, n) in the database 106 in an associated manner. This allows for the recording of a calculation model for roundness loss T(m, n) that can accurately calculate roundness loss T(m, n) according to the combination of the transmission-side antenna and reception-side antenna and the terrain data.

The administration portion 116 of the diffraction loss analysis device 1, upon acquiring a combination ID indicating the transmission-side and reception-side antennas from a user such as an administrator via an interface, reads out the calculation model of the roundness loss T(m, n) recorded in the database 106 associated with that combination ID, and presents it to a terminal or other device used by the administrator (Step S108). Alternatively, the administration portion 116 of the diffraction loss analysis device 1, upon acquiring topographic data from a user such as an administrator via an interface, may read the calculation model of roundness loss T(m, n) recorded in the database 106 associated with topographic data similar to that topographic data and present it to a terminal or the like used by the administrator. The recording portion 115 of the diffraction loss analysis device 1 may record the calculation model of roundness loss T(m, n) in the database 106, in association with the installation locations, in terms of latitude, longitude, and altitude, of the transmission-side and reception-side antennas. The administration portion 116 may then acquire the respective installation positions of the new transmission-side antenna and the new reception-side antenna via the interface from the administrator or other user, read the calculation model of roundness loss T(m, n) recorded in the database 106 associated with each installation position that is close to the installation positions, and present it to a terminal or other device used by the administrator.

This allows the administrator to acquire a calculation model capable of calculating the appropriate roundness loss T(m, n) according to the transmission-side and reception-side antennas and calculate the roundness loss T(m, n) in the line design and other processes.

While the knife-edge diffraction loss J(v) can be easily calculated, the value of the roundness loss T(m, n) is difficult to estimate because it is based on terrain data. Therefore, in a related technique, the value of the roundness loss T(m, n) was fixed to a specified value or the like, and the diffraction loss A corresponding to the radio communication path was calculated. However, the above process can easily calculate the roundness loss T(m, n) on the basis of a roundness loss estimation model that estimates the roundness loss according to the cross-sectional roundness in the direction of the radio communication path of the terrain data shape of the radio communication path between the transmission-side antenna and reception-side antenna. This allows for highly accurate analysis of diffraction loss, one of the propagation losses in the radio communication path between the installation locations of any transmission-side antenna and reception-side antenna.

Figure 7:
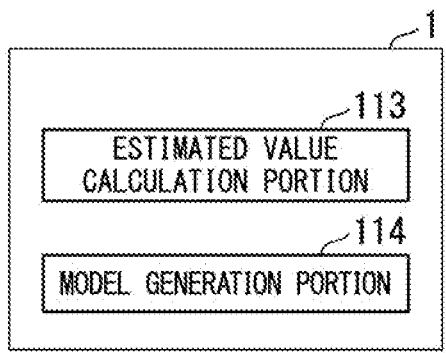
FIG. 7 is a diagram showing an example of the configuration of the diffraction loss analysis device according to the present example embodiment.

FIG. 7 is a diagram showing an example of the configuration of the diffraction loss analysis device according to the present example embodiment.

Figure 8:
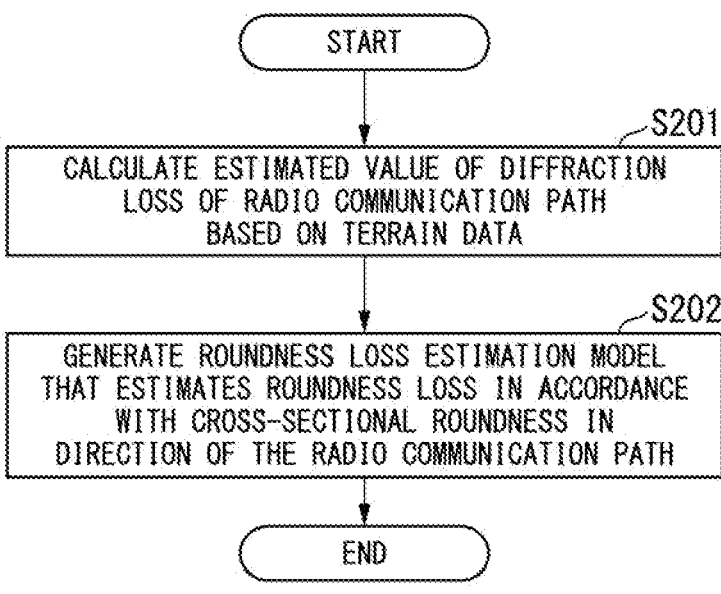
FIG. 8 is a diagram showing the processing flow by the diffraction loss analysis device shown in FIG. 7.

FIG. 8 is a diagram showing the processing flow by the diffraction loss analysis device shown in FIG. 7.

The diffraction loss analysis device 1 performs at least the functions of the estimated value calculation portion 113 and the model generation portion 114.

The estimated value calculation portion 113 calculates the estimated value of the diffraction loss of the radio communication path based on the terrain data of the radio communication path between the installation positions of the transmission-side antenna and the reception-side antenna (Step S201).

The model generation portion 114 generates a roundness loss estimation model that estimates roundness loss in accordance with the cross-sectional roundness in the direction of the radio communication path of the terrain data shape in the diffraction loss calculation formula, on the basis of the relationship between the estimated value of the diffraction loss and the diffraction loss calculation formula, and the actual measured value of the diffraction loss (Step S202).

Each of the above devices has a computer system inside. Each of the above-mentioned processes is stored in a computer-readable recording medium in the form of a program, and the computer reads and executes this program to perform the above-mentioned processes. Here, a computer-readable recording medium refers to magnetic disks, optical disks, CD-ROMs, DVD-ROMs, semiconductor memory, etc. The computer program may also be delivered to a computer via a communication line, and the computer receiving this delivery may execute the program.

The above program may also be used to realize some of the aforementioned functions. Furthermore, the above program may be a so-called differential file (differential program), which can realize the aforementioned functions in combination with a program already recorded in the computer system.

Priority is claimed on Japanese Patent Application No. 2021-151197, filed Sep. 16, 2021, the content of which is incorporated herein by reference.

INDUSTRIAL APPLICABILITY

The present disclosure may be applied to a diffraction loss analysis device, a diffraction loss analysis method, and a recording medium.

DESCRIPTION OF REFERENCE SIGNS

1 Diffraction loss analysis device
10, 20 Antenna
100 Radio communication system
111 Control portion
112 Acquisition portion
113 Estimated value calculation portion
114 Model generation portion
115 Recording portion
116 Administration portion

What is claimed is:

1. A diffraction loss analysis device comprising:
at least one memory configured to store instructions; and
at least one processor configured to execute the instructions to:
  calculate, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna, and
  generate a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

2. The diffraction loss analysis device according to claim 1, wherein the diffraction loss calculation formula includes a knife-edge diffraction loss calculation formula and a roundness loss calculation formula, and the estimated value of the diffraction loss is the sum of the knife-edge diffraction loss calculated by the knife-edge diffraction loss calculation formula and the roundness loss calculated by the roundness loss calculation formula, and
  wherein the at least one processor is configured to execute the instructions to generate the roundness loss estimation model on the basis of the relationship between the diffraction loss calculation formula, the estimated value of the diffraction loss calculated using the diffraction loss calculation formula, and the actual measured value of the diffraction loss.

3. The diffraction loss analysis device according to claim 1, wherein the at least one processor is configured to execute the instructions to:
  record the terrain data of the radio communication path between the installation location of the transmission-side antenna and the installation location of the reception-side antenna, and the roundness loss estimation model; and
  present the roundness loss estimation model on the basis of either the terrain data or antenna information about the installation location of the new transmission-side antenna and the installation location of the reception-side antenna.

4. A diffraction loss analysis method comprising:
calculating, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna, and
generating a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

5. The diffraction loss analysis method according to claim 4, wherein the diffraction loss calculation formula includes a knife-edge diffraction loss calculation formula and a roundness loss calculation formula, and the estimated value of the diffraction loss is the sum of the knife-edge diffraction loss calculated by the knife-edge diffraction loss calculation formula and the roundness loss calculated by the roundness loss calculation formula, and
  wherein the method further comprises generating the roundness loss estimation model on the basis of the relationship between the diffraction loss calculation formula, the estimated value of the diffraction loss calculated using the diffraction loss calculation formula, and the actual measured value of the diffraction loss.

6. The diffraction loss analysis method according to claim 4 further comprising:
recording the terrain data of the radio communication path between the installation location of the transmission-side antenna and the installation location of the reception-side antenna, and the roundness loss estimation model; and
presenting the roundness loss estimation model on the basis of either the terrain data or antenna information about the installation location of the new transmission-side antenna and the installation location of the reception-side antenna.

7. A non-transitory recording medium that stores a program for causing a computer of a diffraction loss analysis device to execute:
calculating, using a diffraction loss calculation formula, an estimated value of the diffraction loss of a radio communication path on the basis of terrain data indicating the ground surface corresponding to the radio communication path between the installation location of a transmission-side antenna and the installation location of a reception-side antenna, and generating a roundness loss estimation model that estimates roundness loss in accordance with the cross-sectional roundness in the direction of the radio communication path on the ground surface indicated by the terrain data, on the basis of the relationship between the estimated value of the diffraction loss and the diffraction loss calculation formula, and the actual measured value of the diffraction loss.

8. The non-transitory recording medium according to claim 7, wherein the diffraction loss calculation formula includes a knife-edge diffraction loss calculation formula and a roundness loss calculation formula, and the estimated value of the diffraction loss is the sum of the knife-edge diffraction loss calculated by the knife-edge diffraction loss calculation formula and the roundness loss calculated by the roundness loss calculation formula, and wherein the program further executes generating the roundness loss estimation model on the basis of the relationship between the diffraction loss calculation formula, the estimated value of the diffraction loss calculated using the diffraction loss calculation formula, and the actual measured value of the diffraction loss.

9. The non-transitory recording medium according to claim 5, wherein the program further executes:

recording the terrain data of the radio communication path between the installation location of the transmission-side antenna and the installation location of the reception-side antenna, and the roundness loss estimation model; and presenting the roundness loss estimation model on the basis of either the terrain data or antenna information about the installation location of the new transmission-side antenna and the installation location of the reception-side antenna.

\* \* \* \* \*